(12) United States Patent
Suto et al.

(10) Patent No.: US 7,900,038 B2
(45) Date of Patent: Mar. 1, 2011

(54) METHOD AND APPARATUS FOR A BROKER ENTITY

(75) Inventors: Lawrence B. Suto, Oakland, CA (US); Pamela Colbert, San Francisco, CA (US); Julius Akinyemi, Tiburon, CA (US); Rebecca Wanta, Fountain Hills, AZ (US)

(73) Assignee: Wells Fargo Bank, N.A., San Francisco, CA (US)

( * ) Notice: Subject to any disclaimer, the term of this patent is extended or adjusted under 35 U.S.C. 154(b) by 1751 days.

(21) Appl. No.: 10/426,209

(22) Filed: Apr. 29, 2003

(65) Prior Publication Data

US 2004/0220882 A1 Nov. 4, 2004

(51) Int. Cl.
*G06F 15/173* (2006.01)
*G06F 15/16* (2006.01)

(52) U.S. Cl. ............. 713/151; 709/204; 709/238; 726/3; 713/153

(58) Field of Classification Search .................. None
See application file for complete search history.

(56) References Cited

U.S. PATENT DOCUMENTS

| | | | |
|---|---|---|---|
| 5,671,279 A | 9/1997 | Elgamal | 380/23 |
| 5,680,461 A | 10/1997 | McManis | 380/25 |
| 5,850,449 A | 12/1998 | McManis | 380/25 |
| 5,884,035 A | 3/1999 | Butman et al. | 395/200.48 |
| 5,933,498 A | 8/1999 | Schneck et al. | 380/4 |
| 5,963,975 A | 10/1999 | Boyle et al. | 711/147 |
| 5,982,891 A | 11/1999 | Ginter et al. | 380/4 |
| 5,987,132 A | 11/1999 | Rowney | 380/24 |
| 5,996,076 A | 11/1999 | Rowney et al. | 713/201 |
| 6,012,100 A | 1/2000 | Frailong et al. | 709/250 |
| 6,023,684 A | 2/2000 | Pearson | 705/35 |
| 6,026,379 A | 2/2000 | Haller et al. | 705/34 |
| 6,064,984 A | 5/2000 | Ferguson et al. | 705/36 |
| 6,073,172 A | 6/2000 | Frailong et al. | 709/222 |
| 6,088,005 A | 7/2000 | Walls et al. | 345/4 |
| 6,092,202 A | 7/2000 | Veil et al. | 713/201 |
| 6,112,304 A | 8/2000 | Clawson | 713/156 |
| 6,115,742 A | 9/2000 | Franklin et al. | 709/224 |
| 6,119,105 A | 9/2000 | Williams | 705/39 |
| 6,158,010 A | 12/2000 | Moriconi et al. | 713/201 |
| 6,163,772 A | 12/2000 | Kramer et al. | 705/79 |
| 6,182,226 B1 | 1/2001 | Reid et al. | 713/201 |
| 6,185,184 B1 | 2/2001 | Mattaway et al. | 370/230 |
| 6,185,683 B1 | 2/2001 | Ginter et al. | 713/176 |
| 6,219,790 B1 | 4/2001 | Lloyd et al. | 713/201 |
| 6,233,565 B1 | 5/2001 | Lewis et al. | 705/35 |

(Continued)

FOREIGN PATENT DOCUMENTS

EP 776 112 5/1997

(Continued)

OTHER PUBLICATIONS

*A Framework for Secure Remote Access to Home Applications Over the Internet*; A. Kara; Journal of Shanghai University; Sep. 2001.

(Continued)

*Primary Examiner* — Kaveh Abrishamkar
(74) *Attorney, Agent, or Firm* — Merchant & Gould P.C.

(57) ABSTRACT

A method and apparatus for a broker entity is provided. A high-speed embedded firewall, a message-processing router, secure session protocol, transport management, and integrated intrusion detection is provided in a single-chip format.

25 Claims, 1 Drawing Sheet

U.S. PATENT DOCUMENTS

| | | | |
|---|---|---|---|
| 6,253,027 B1 | 6/2001 | Weber et al. | 386/287 |
| 6,266,340 B1 | 7/2001 | Pickett et al. | 370/442 |
| 6,266,704 B1 | 7/2001 | Reed et al. | 709/238 |
| 6,292,830 B1 | 9/2001 | Taylor et al. | 709/224 |
| 6,298,043 B1 | 10/2001 | Mauger et al. | 370/248 |
| 6,304,915 B1 | 10/2001 | Nguyen et al. | 709/250 |
| 6,304,973 B1 | 10/2001 | Williams | 713/201 |
| 7,139,798 B2 * | 11/2006 | Zircher et al. | 709/204 |
| 7,248,978 B2 * | 7/2007 | Ransom | 702/62 |
| 7,305,464 B2 * | 12/2007 | Phillipi et al. | 709/223 |
| 7,490,350 B1 * | 2/2009 | Murotake et al. | 726/11 |

FOREIGN PATENT DOCUMENTS

| | | |
|---|---|---|
| EP | 680 053 | 7/1997 |
| EP | 917 120 | 5/1999 |
| EP | 936 530 | 8/1999 |
| EP | 948 235 | 10/1999 |
| EP | 949 595 | 10/1999 |

OTHER PUBLICATIONS

*An Integrated Architecture for Deploying a Virtual Private Medical Network Over the Web*; S. Gritzalis, D. Gritzalis, C. Moulinos, and J. Iliadis; Medical Informatics and the Internet in Medicine; Jan.-Mar. 2001.

*Secure Information Flow Model for Corporate Network*; K. Juszczyszyn; Information Systems Architecture and Technology ISAT 2000; 2000'.

*Security in IP Networks*; P. McDermott; Network Security; Dec. 2000.

*Extend Your Net With VPN's*; M. Stern; BYTE; Nov. 1997.

*Application of Virtual Private Networking Technology to Standards-Based Management Protocols Across Heterogeneous Firewall-Protected Networks*; S. O'Guin, C.K. Williams, and N. Selimis; Oct. 31-Nov. 3, 1999.

*Secure VPNs: Lock the Data Unlock the Savings*; A. Cray; Data Communications International; May 21, 1997.

RFC 2574; *BGP/MPLS VPNs*; E. Rosen Y. Rekhter; Cisco Systems, Inc.; Mar. 1999.

RFC 2764; *A Framework for IP Based Virtual Private Networks*, B. Gleeson, and A. Lin of Nortel Networks and J. Heinanen, Telia Finland, G. Armitage, and A. Malls of Lucent Technologies; Feb. 2000.

RFC 2917; *A Core MPLS IP VPN Architecture*; K. Muthurishnar of Lucent Technologies and A. Malis of Vivace Networks, Inc.; Sep. 2000.

*Models of Synthesis of a Distributed Authentication System of a Virtual Private Reconfigurable Network*; R.M. Alguliev; Journal of Computer and Systems Sciences International; Mar.-Apr. 2000.

*Group Management Strategies for Secure Multicasting on Active Virtual Private Networks*; C. Labonte, and S. Srinivas; Proceedings of the 25th Annual IEEE Conference on Local Computer Networks; Nov. 8-10, 2000.

*Virtual Private Networks—How They Work*; R. Younglove; Computing & Control Engineering Journal; Dec. 2000.

*Synthesis of a Distributed Authentication System for a Virtual Private Network with a Reconfigurable Star-Ring Structure*: R.M Alguliev, and V.A Pelipeiko; Automated Control and Computer Sciences; 2000.

*IP Security Protocols*; E. Bozoki; Dr. Dobb's Journal; Dec. 1999.

*Method of Selecting the Optimal Structure of a Distributed Authentication System in Virtual Private Networks*; R.M. Alguliev; Automatic Control and Computer Sciences; 1999.

*Electronic Commerce on the Internet*; J. Rawlings; Network Security; Jul. 1998.

*A Global-Memory Message-Passing Multiprocessor*; E.E, Johnson; Microprocessors and Microsystems; Oct. 1991.

*Switch-Based Virtual Private Line Service for the Financial Services Industry*; R. Bose, S.L. Cocklin, E.C. Schloemer, K.J. Burke; GLOBECOM '90 IEEE Global Telecommunications Conference and Exhibition; Dec. 2-5, 1990.

*A Homogeneous Network for Data0Sharing Communications*; E.G. Manning, and R.W. Peebles; Computer Networks; May 1977.

*Onion Routing for Anonymous and Private Internet Connections*; David Goldschlag, Michael Reed, and Paul Syverson; Jan. 28, 1999.

*Adaptive: An Object-Oriented Framework for Flexible and Adaptive Communication Protocols*; Donal F. Box. Douglas C. Schmit, and Tatsuya Suda.

*From Internet to ActiveNet*; D.L. Tennenhouse, S.J. Garland, L. Shrira, and M.F. Kaashoek.

RFC 2685; *Virtual Private Networks Identifier*: B. Fox, and B. Gleeson; Sep. 1999.

RFC 2735; *NHRP Support for Virtual Private Networks*; B. Fox, and B. Petri; Sep. 1999.

\* cited by examiner

METHOD AND APPARATUS FOR A BROKER ENTITY

BACKGROUND OF THE INVENTION

1. Technical Field

The invention relates to secure end-to-end transactions. More particularly, the invention relates to a broker entity having a high-speed embedded firewall, a message-processing router, secure session protocol, transport management, and integrated intrusion detection in a single-chip format.

2. Description of the Prior Art

Computer networks and related devices, such as smart cards, are established media for conducting electronic commerce (e-commerce) and other types of transactions. As with any industry having to do with commerce, the providers of the e-commerce industry technology continually strive to maintain the integrity and validity of the financial transactions for the comfort of users. These systems typically are widely distributed (anywhere in the world) and transmit highly confidential information. There are many security gaps in prior art solutions. In addition, the providers of the e-commerce technology strive to maintain a superior level of speed and efficiency for the user, while keeping the technology development environment up-to-date. Thus, it is currently a challenge to provide a technology that can perform complete, open standards-based, high-speed, and highly secure financial transactions to the satisfaction of users. InterTrust Technologies Corp. ("InterTrust") (Santa Clara, Calif.) teaches software access control mechanisms in the standard (standalone computer) as well as the embedded hardware space in a family of disclosures. For example, K. L. Ginter, V. H. Shear, F. J. Spahn, and D. M. Van Wie, Systems and Methods for Secure Transaction Management and Electronic Rights Protection, U.S. Pat. No. 6,427,140 (Jul. 30, 2002) disclose electronic appliances such as computers equipped in such a way as to help ensure that information is accessed and used only in authorized ways, and maintain the integrity, availability, and/or confidentiality of the information. The disclosures teach electronic appliances providing a distributed virtual distribution environment (VDE) that may enforce a secure chain of handling and control stored or disseminated information, for example. According to Ginter, et al, distributed and other operating systems, environments and architectures, such as, for example, those using tamper-resistant hardware-based processors, may establish security at each node.

T. C. Williams, Multi-level Security Network System, U.S. Pat. No. 6,304,973 (Oct. 16, 2001) discloses a network which prevents unauthorized users from gaining access to confidential information. The network has various workstations and servers connected by a common medium and through a router to the Internet. The network has two major components, a Network Security Center (NSC) and security network interface cards or devices. The NSC is an administrative workstation through which the network security officer manages the network as a whole as well as the individual security devices. The security devices are interposed, between each of workstation, including the NSC, and the common medium and operate at a network layer (layer 3) of the protocol hierarchy. The network allows trusted users to access outside information, including the Internet, while stopping outside attackers at their point of entry. At the same time, the network limits an unauthorized insider to information defined in their particular security profile. The user may select which virtual network to access at any given time. The result is trusted access to multiple secure Virtual Private Networks (VPN), all from a single desktop machine.

Williams focuses on the multi-level secure VPN space with some access control capability based on the actual content of the network data stream running through the device. That is, Williams is limited in that it teaches simply a filter encompassing the notion of a multi-level secure VPN for network secures VPNs that filters and allows access for network connections based on data content.

Lucent teaches secure gathering and monitoring of web server logs, currently implemented within many products in the marketplace today. It should be appreciated that the Lucent disclosure is limited by being Web-based and its log entries are not secure.

It would be advantageous to create a secure end-to-end financial transactional messaging environment in an integrated package leveraging complete, open standards-based, high-speed and highly secure technology which integrates a firewall, VPN, intrusion detection and tamper resistant audit; secure logging, and fault tolerance over IP networks.

It would also be advantageous to provide multiple simultaneous transactions, which are multilevel and secure by having application objects running inside a broker entity as multilevel secure streams enter and leave, thereby a providing more sophisticated technology than mere filtering.

SUMMARY OF THE INVENTION

A method and apparatus for a broker entity is provided. A high-speed embedded firewall, a message-processing router, secure session protocol, transport management, and integrated intrusion detection is provided in a single-chip format.

DETAILED DESCRIPTION OF THE INVENTION

Figure 1:
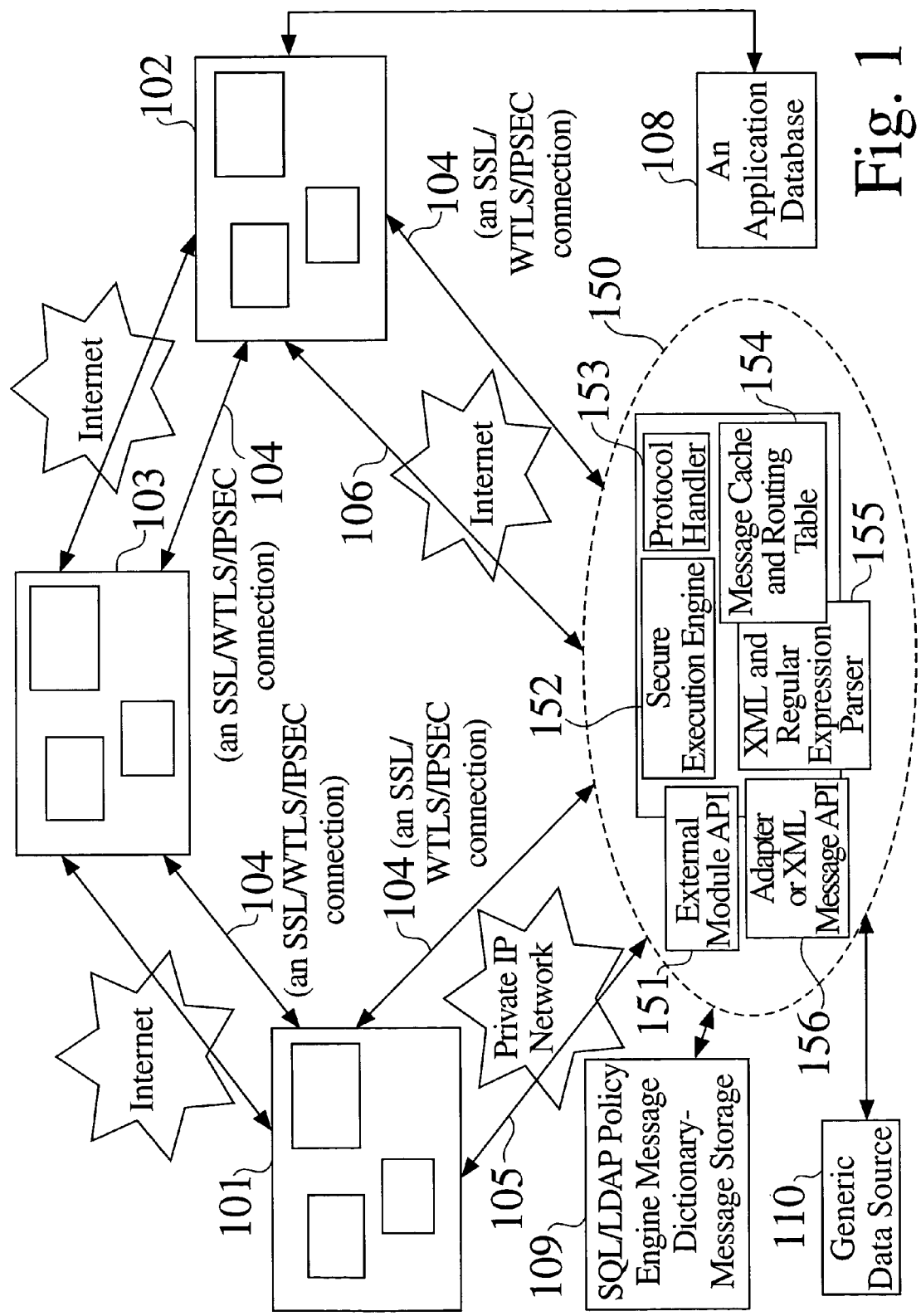
FIG. 1 is a schematic diagram of the components of the broker entity and its relationship to other such broker entities according to the invention.

A method and apparatus for a message broker entity is provided. A high-speed embedded firewall, a message-processing router, secure session protocol, transport management, and integrated intrusion detection is provided in a single-chip format. It should be appreciated that the broker entity can be implemented as a collection of conceptual and/or software modules residing on one or more computers across a network, and can equally be implemented in hardware as an integrated circuit on a chip connected across the network to other such chips or software modules.

A preferred embodiment of the invention is a message broker entity, or broker entity for short, implemented as an integrated circuit for financial messaging. Just as traditional integrated circuits contain embedded components, the preferred embodiment of the invention contains embedded components working together to handle elements of communication, message processing, and security. The preferred embodiment of the invention combines a firewall, a virtual private network (VPN), a transport manager, an intrusion detection feature, a secure logger, a message processor, a message forwarder, a directory service, and a cryptographic processor. When such features are combined into a high-speed hardware device, they bring to market an end-to-end and open and secure e-commerce transactional environment. All message processing, routing, and security sensitive operations, such as creating or tearing down secure sessions with other broker entities, takes place in secure high-speed hardware.

The broker entity integrates the following concepts:

A self-repairing transactional mesh with integrated failover when security relevant events or service interruption are detected at any node. For example, if a node is breached or rendered inoperable, then the system reconfigures itself to complete the transaction and remain operable. One example of enabling the mesh to reconfigure itself is by a setting up to run a script at each node, instructing it how to react. The reaction can be policy-based. It can suggest alternative actions, such as turning itself off if it gets inundated with too many junk messages.

Integrated hardware-based cryptographic operations, a suite of cryptographic algorithms are available onboard in secure hardware for any transaction.

Hardware-based state machine technology, capable of loading C/C++ as well as Java-based objects for onboard execution.

Application objects as well as network connections are stored/routed/executed in a true multi-level secure memory space, such as B2.

Providing a hardware-based XML parser, for parsing and performing operations on XML objects within a secure embedded memory space.

Security filtering and logging can be performed on encrypted network streams as they enter the secure embedded memory space.

In one embodiment of the invention, each broker entity board contains multiple embedded XML parsers, where some or all of such boards are placed in a rack-mountable system, and where some or all of such rack-mountable systems are interconnected, resulting in a multi-gigabit high-speed backplane. In this embodiment of the invention, the broker entity can be viewed as a virtual private transaction processor with Web services support.

A preferred embodiment of the invention is described with reference to FIG. 1, a schematic diagram of the components of the broker entity and its relationship to other such broker entities. Such layout in the diagram is meant to be by example only of one application of the invention, as a limitless number of configurations of broker entities are possible.

A broker entity 150 is represented in a dotted oval figure as a combination of six distinct components. Each component will be discussed in further detail below. The broker entity 150 is shown connected across a network to a couple of other such broker entities 101 and 102, that are also connected to a fourth broker entity 103. The secure protocol in the preferred embodiment is SSL/WTLS/IPSEC 104, but it should be appreciated that the invention is not limited to this particular type of connection. The broker entity 150 is connected to one broker entity 101 across a private network 105, and is also connected across the Internet 106 to the other broker entity 102. These two broker entities 101 and 102 are connected to the fourth broker entity 103 across the Internet 106. It should be appreciated that these connections are examples of connections only. The connections can be simply any network connections.

From a high level perspective, the schematic diagram shows the mesh architecture of broker entities, each a self-contained, static core engine, and each communicating with one another. The mesh architecture is a combination of broker entities spanning one-to-many and many-to-one relationships. Each broker entity capable of determining XML status, discovery, and secure negotiation protocol, where each secure session can be negotiated and destroyed dynamically, in a cache that is updated frequently.

The preferred embodiment of the invention provides subscription architecture enabling the broker entity to be connected to subscribing systems anywhere in the world. The subscriber communicates with the broker entity by sending messages to the broker entity, which communicates with the subscriber both as a consumer and as a producer of messages. The broker entity is capable of interacting with a variety of different sources of data.

The subscriber can be represented as any data source. For example, the data source can be an application database of a backend system 108, or as a data source in any DB2 environment, such as, for example, the policy-engine-message-dictionary message storage 109 depicted in FIG. 1. It should be appreciated that in the preferred embodiment of the invention, broker entity clients 110 subscribe to a shared XML space using a particular broker API or message adapter in a point-to-point or publish and subscribe configuration.

The preferred embodiment of the broker entity 150 contains the following six components or conceptual modules: external module API 151; secure execution engine 152; protocol handler 153; message cache and routing table 154; XML and regular expression parser 155; and adapter or XML message API 156.

The external module API 151 and the adapter or XML message API 156 are the interface components or modules to the subscribing clients. The router component or module 154 keeps a table of all broker entities that it trusts and services in high-speed cache. The protocol handler 153 allows communication with other such broker entities across a network and has dynamic capability. It is preferably installed at different contact points within a network. It allows setting and following a security policy that chooses acceptable protocol. The message cache and routing table 154 provides caching in the case that a connection breaks down. It holds onto a request until it can be fulfilled. The routing table 154 also provides the status of available devices. The routing table 154 is kept in memory and is updated frequently to reflect the current security level of the broker entity at hand, the services the broker entity provides and/or subscribes to, and detected presence of other broker entities. The XML and regular expression parser 155 is preferably embedded in hardware for performing character parsing in high speed. The external module API 151 loads, i.e. stores, configuration information and data about outside systems. Essentially it defines outside systems as a way to enable communicating with them. The adapter or XML message API 156 provides a way of defining new data for any type of system, such as message types and rules, by providing an open, standardized API to systems of record and/or to any database.

It should be appreciated that the preferred embodiment of the invention is implemented as an appliance operating in a plug-and-play fashion. Its major functionality is implemented onboard using Application-Specific Integrated Circuit (ASIC) and Field Programmable Gate-Array (FPGA) technology. It processes messages and transacts securely over networks at multi-gigabit wire-speeds. The embodiment uses a router that communicates in Extensible Markup Language (XML), enabling the router to be extensible and capable of expressing practically any type of structured financial message.

The preferred embodiment of the invention discovers or detects the presence of other such broker entities, as well as the services they offer or the services that subscribe to them. Transactions between the broker entity and other such brokers and/or any services attached to those brokers are secure transactions. For example, a first broker entity is notified by a client that the client is online. The first broker entity then notifies a second broker entity, or one of its connected services, that it has a message from the client and routes the message to the second broker entity accordingly.

More specifically, the preferred embodiment of the invention provides a directory of all of broker entities with which it communicates and trusts and/or their respective services. A copy of this directory is resident on onboard high-speed cache. The directory is updated in real-time. When a particular broker entity or service which subscribes to it directly goes down, the broker entity notifies other broker entities on the list and communicates that that broker entity and/or particular services are unavailable for transactions. The opposite occurs when a broker entity or its subscribing services come online. In this case, the broker entity notifies the other broker entities it trusts that it and/or its services have come online for transactions.

For discovery, the preferred embodiment of the invention uses basic XML-based protocol to discover and set up services it will process and messages it will receive from or send to other broker entities. Also, as the Universal Description, Discovery and Integration (UDDI) specification matures, the preferred embodiment of the invention adaptably looks up and registers new services and connection rules as they become available online.

The preferred embodiment of the invention also has a transport handler component or module and basic messaging protocol capability. This component or module is adapted to be flashed with new transport protocols and conversation messages, as appropriate.

The preferred embodiment of the invention also provides a message handling agreement or contracts conceptual component or module that allows agreements to be configured on all message exchanges. Examples of such configured messages reflect timeout values, latency period, round-trip times, and allowable return messages. If agreements are violated, the broker entity is configurable to perform alternate procedures, such as, for example, send a response to the requester or take another action, such as consult a set of alternate delivery methods or locations. It should be appreciated that these alternate procedures are by example only.

For secure session protocol, the preferred embodiment of the invention sets up, dynamically or with a pre-established contract, a Secure Sockets Layer/WTLS/Internet Protocol Security (SSL/WTLS/IPSEC) connection with other broker entities.

Also, in a preferred embodiment of the invention, the router selectively encrypts/decrypts XML messages, as well as sometimes verifies signatures on XML messages at the tag level flowing through it. The broker entity expresses trust relationships and transactions using compact certificate technology, where each broker entity has a transaction definition table to decode transaction certificates it receives from other broker entities.

The preferred embodiment of the invention understands messages based on a message dictionary and a corresponding API. Using the message dictionary, the broker entity processes and forwards virtually any type of structured message. Specifically, the router is loaded with virtually any type of XML-based messaging protocol, and the processing and security rules are then custom-defined for the loaded protocol by configuring the appropriate router subsystem.

It should be appreciated that the core code of the broker entity implementing permissions and authentication resides in protective memory, in an embedded implementation, i.e. a hard real-time kernel.

It should also be appreciated that the preferred embodiment of the invention also calls gateway adapters to other messaging or application systems, such as, for example, MQ-Series. The broker entity communicates directly with Common Object Request Broker Architecture (CORBA) or Enterprise JavaBeans (EJBs) via the Simple Object Access Protocol (SOAP) protocol.

The preferred embodiment of the invention also provides maintenance interface enabling code running onboard that is updated without requiring the broker entity be shutdown, the interface also allowing system level testing to be performed. A secure remote administration utility is provided that allows all components or modules of the broker entity to be monitored and configured while it in operation.

Accordingly, although the invention has been described in detail with reference to particular preferred embodiments, persons possessing ordinary skill in the art to which this invention pertains will appreciate that various modifications and enhancements may be made without departing from the spirit and scope of the claims that follow.

The invention claimed is:

1. A method for providing an end-to-end, open, and secure commerce transactional environment, comprising the steps of:

providing a first broker entity, the first broker entity implemented as an appliance using Application-Specific Integrated Circuit (ASIC) and Field Programmable Gate-Array (FPGA) technology, the appliance being insertable into a hardware device in a plug-and-play fashion, the first broker entity:

providing an external module API;

providing a secure execution engine;

providing a protocol handler that enables the first broker entity to communicate with other broker entities;

notifying the other broker entities that the first broker entity and services of the first broker entity have come online, the other broker entities being trusted by the first broker entity;

receiving a request from a first client, the first client subscribing to the first broker entity as a point-to-point or publish-and-subscribe configuration;

providing a message cache and routing table component, the message cache and routing table component keeping a table comprising data regarding the other broker entities, services offered by the other broker entities, and services offered by subscribers to the other broker entities, the message cache and routing table component holding onto the request until the request can be fulfilled by a given service that is currently not available, the services offered by the other broker entities being trusted by the first broker entity;

updating the table in real-time as the other broker entities come online or go offline and as the services offered by the other broker entities or the subscribers of the other broker entities become available or unavailable;

notifying the other broker entities that a third broker entity has gone down, the first broker entity subscribing directly to the third broker entity;

providing an XML and regular expression parser; and providing an XML message API;

receiving notification that a second client has come online; and routing the request to a second broker entity after the receiving notification that the second client has come online, a second client subscribing to the second broker entity, the second client offering the given service.

2. The method of claim 1, wherein said external module API and said XML message API are interface components to subscribing clients.

3. The method of claim 1, wherein said protocol handler allows communication with the other broker entities across a network, wherein said network is any of a virtual private network and the Internet.

4. The method of claim 1, wherein said protocol handler can negotiate and destroy secure sessions dynamically.

5. The method of claim 1, wherein said protocol handler is installed at different contact points within a network.

6. The method of claim 1, wherein said protocol handler allows setting and following a security policy that chooses acceptable protocol.

7. The method of claim 1, wherein said message cache and routing table component provides status of available devices.

8. The method of claim 1, wherein said message cache and routing table component provides current security level, services provided, services subscribed to, and indications of detected presence of the other broker entities.

9. The method of claim 1, wherein said XML and regular expression parser is embedded in hardware for performing character parsing in high speed.

10. The method of claim 1, wherein said external module API stores configuration information and data about outside systems.

11. The method of claim 1, wherein said XML message API provides an open, standardized API to systems of record and/or to any database.

12. The method of claim 11, wherein said XML message API provides message types and rules information.

13. The method of claim 1, further comprising the step of: discovering other broker entities and setting up services to other broker entities using basic XML-based protocol.

14. The method of claim 1, further comprising the step of: using Universal Description, Discovery and Integration (UDDI) specification for looking up and registering new services and connection rules as they become available online.

15. The method of claim 1, further comprising the step of: flashing with new transport protocols and basic messaging protocols.

16. The method of claim 1, further comprising the step of: allowing agreements to be configured on message exchanges, resulting in, but not limited to, configured messages.

17. The method of claim 16, wherein said configured messages comprise, but are not limited to, timeout values, latency period, round-trip times, and allowable return messages.

18. The method of claim 16, further comprising the step of: configuring to perform alternate procedures when said agreements are violated.

19. The method of claim 1, further comprising the step of: providing a Secure Sockets Layer/WTLS/Internet Protocol Security (SSL/WTLS/IPSEC) connection with the other broker entities.

20. The method of claim 1, further comprising the step of: selectively encrypting/decrypting XML messages and verifying signatures on XML messages at tag level.

21. The method of claim 1, further comprising the step of: using compact certificate technology, wherein the first broker entity has a transaction definition table to decode transaction certificates received from the other broker entities.

22. The method of claim 1, further comprising the step of: providing a message dictionary data source and a corresponding API for custom-defined the processing and security rules.

23. The method of claim 1, wherein permissions and authentication processing is embedded in a hard real-time kernel.

24. The method of claim 1, further comprising the step of: communicating with, but not limited to, MQ-Series and Common Object Request Broker Architecture (CORBA) and Enterprise JavaBeans (EJBs) via the Simple Object Access Protocol (SOAP) protocol.

25. The method of claim 1, further comprising the step of: providing maintenance interface enabling code running onboard allowing updating and system level testing to be performed while in operation.

* * * * *

UNITED STATES PATENT AND TRADEMARK OFFICE
CERTIFICATE OF CORRECTION

PATENT NO. : 7,900,038 B2
APPLICATION NO. : 10/426209
DATED : March 1, 2011
INVENTOR(S) : Suto et al.

Page 1 of 1

It is certified that error appears in the above-identified patent and that said Letters Patent is hereby corrected as shown below:

In the Claims:

Col. 8, line 25, claim 22: "API for custom-defined" should read --API for custom-defining--

Signed and Sealed this
Thirtieth Day of April, 2013

Teresa Stanek Rea
*Acting Director of the United States Patent and Trademark Office*